Patented Jan. 22, 1924.

1,481,357

UNITED STATES PATENT OFFICE.

ARTHUR S. DWIGHT, OF NEW YORK, N. Y., ASSIGNOR TO DWIGHT & LLOYD METALLURGICAL COMPANY, OF NEW YORK, N. Y., A CORPORATION OF NEW JERSEY.

TREATMENT OF ORES.

No Drawing. Application filed April 29, 1922. Serial No. 557,377.

*To all whom it may concern:*

Be it known that I, ARTHUR S. DWIGHT, a citizen of the United States, residing at New York, in the county of New York and State of New York, have invented certain new and useful Improvements in the Treatment of Ores, of which the following is a specification, reference being had therein to the accompanying drawing.

This invention relates to an improved process for treating iron ore in such way that the iron can be obtained in sponge form, without smelting, and in a superior condition.

The iron ores with which I have worked, in developing the invention, comprise, in the native conditions in which they are found, not only iron in the form of oxide, but also other metals and elements such as manganese, titanium, copper, sulphur, and others, and these have prevented the obtaining of the iron in pure condition unless the ore is laboriously subjected to expensive treatment.

In the ordinary treatment of iron ores to obtain the metal by a reduction process (depending upon the use of a gaseous compound of carbon), the reactions involved are delicate and easily halted and reversed. I have found that the character of the reaction depends upon the physical structure of the ore material to be treated (that is as to whether it has a compact impervious structure that is highly porous), and also upon the relations to each other of the composition of the reducing gas, the temperature of the mass, and other conditions.

I have also found that if a reducing gas is employed whose initial efficiency for such work is 100 per cent, it is rapidly lowered in its efficiency after commencing to come into contact with the oxides of iron at the temperatures which are favorable to the promotion of the reducing action.

For example, if a gas of the "water gas" class, namely, a mixture of carbon monoxide and hydrogen (CO+H) is used, the products of the reaction of the oxides of iron upon the gas, initially pure, rapidly generate carbon dioxide ($CO_2$) and water vapor ($H_2O$). These newly formed gaseous ingredients rapidly mix with the volume of the reducing gas (CO+H), and as soon as the volume ratio of the initially pure gas (CO+H) is reduced to 70 per cent, or thereabouts (the other 30 per cent being the newly formed carbon dioxide and water vapor), the efficiency of the reducing gas may be regarded as terminated. In fact the gaseous body now becomes such that it tends to exert an oxidizing influence on the metallic components. I shall refer to this ratio (of about 70 per cent of the one and the 30 per cent of the other) as the point of "saturation" of the reducing gas. If the gas, after passing this point of saturation, is kept in contact with the metalliferous material, the reduction action not only will cease, but there is immediately a tendency for the metalliferous components to revert to the original higher oxides.

This saturated gas volume, although no longer efficient as a reducing agent, and although it has become actively detrimental as an oxidizing agent, is still combustible and of important value as a heat generating agent.

As to the degree of temperature necessary for the reduction of the oxides of the metal to the metals themselves: It is to be noted that at a temperature of 700° C., more or less, the oxides of iron can be reduced. And if the reducing treatment in obtaining the iron can be carried on under proper conditions, the iron can be selectively reduced without reducing the accompanying deleterious metallic bodies such as are ordinarily reduced, together with the iron, under the high temperatures of the blast furnace. And in the treatment of iron ore this selective reduction is one of the important matters which I have attained.

With the above matters noted, the process which I have perfected will be readily understood. I, first, preliminarily prepare the ore in such way that I can cause the reducing gas to rapidly pass through a large mass and, while doing so, enter intimately into all of the interior points of the mass and of its particles. I effect this by preliminarily sintering it. I commingle with the ore, in an approximately pulverulent condition, a quantity of pulverized carbon, and then treat it in sintering apparatus in the manner set forth in my earlier patents, as Patent 1,254,316 granted me January 28, 1918. The result of the sintering treatment is the production of a mass which is not only porous, when considered as an entirety, but one whose minute particles are characterized by the presence of minutely small cells and pores. During the sintering operation gases are formed and freed at each point in the mass, and as the solid particles around each of these gas generating points are in a nascent and more or less plastic condition, continuing for a brief period, the gas formation is instantly followed by the forming of the minute cell walls referred to which are uniformly distributed throughout the ore body, and these permit a rapid entrance of the reducing gases in later treatment.

After sintering, the product is, if necessary, broken, or physically reduced to particles of sizes of, say, two-inch dimensions, and less.

A mass of these sintered and porous ore particles is then introduced into a suitable container and heated. After being heated a hot reducing gas is caused to pass through it. This gas is, with the exertion of care, made 100 per cent efficient, or is brought as near to that point as is possible in its reducing efficiency. It is heated to the proper point for the reduction of iron, but the total heat in the ore mass (regarding both the heat in the ore itself and the heat of the gas) is kept at a point below that at which there will be a reduction of the deleterious elements accompanying the iron. As soon as the gas with its initial efficiency comes into contact with the particles of oxide of iron exposed at the cell walls in the porous sinter, the oxygen is separated from the iron and increases the oxidation of the reducing gas; and this oxidizing of the gas, unless stopped, will, as above described, continue until the newly formed gas oxides again react upon the metal, and the latter reverts to an oxide condition.

To avoid this result I so relate the total temperature in the ore mass and the length of the path for the reducing gas therethrough that as soon as the point of saturation for the gas is reached (that is as soon as 30 per cent, or thereabouts, of its volume has become oxidized by the iron) I cause it to immediately escape from the ore body or from that part of the ore which is undergoing reducing treatment.

The result is a mass of ore in which the iron has been reduced to a sponge condition without any of the deleterious elements being materially affected; and by this process I produce an extremely pure iron.

Before exposing the ore to the air I prefer to abstract from it all of the residue heat which it may carry after the above treatment; for this purpose passing it through a cooling region where it is brought down to ordinary temperature. After such cooling it can be indefinitely exposed.

Returning to the gas which, as above described, is withdrawn from the ore immediately after it is saturated:

This I take to a region where it can be burned in order that I may avail myself of the large quantity of heat that can be generated therefrom. This heat I utilize for preliminarily raising the temperature of the ore (prior to its coming into contact with the reducing gas) or raising the temperature of the reducing gas, or both. As already explained, this gas, although its reducing efficiency becomes nil upon the addition of a relatively small amount of oxygen, is nevertheless susceptible of a much higher oxidation. I commingle air with it and burn it either in direct contact with an ore mass or in a combustion chamber from which the heat can be imparted to the ore. Some ores may require a higher temperature than can be derived from the partially spent gas, and in such cases supplemental heating agencies are employed. But in many cases I have found that not only can the gas, after the reducing stage, be burned in contact with an ore mass, but that it can even be taken from this ore to a second combustion region and still further burned; and in such cases its developed heat can be utilized in raising the temperature of the rich reducing gas.

I do not herein limit the practice of my process to the use of any particular apparatus; but in order that the several steps above referred to may be readily understood the following can be had in mind:

Assume a vertical stack to the top of which the sintered and porous ore can be delivered by a bell and hopper charging device, the particles of the ore mass being preferably of the sizes above specified. Assume further that the chamber in the stack is divided into three well defined vertically superposed regions. The ore, as it descends, is heated to the required point in the uppermost region. As it descends through the next the iron is reduced. As it descends through the third it is cooled by water jackets or equivalent devices, and the iron sponge escapes at the bottom.

In the horizontal planes at the lower end of the second region are tuyères through which highly heated rich reducing gas is introduced; that is to say, gas, such as I have termed gas, which is 100 per cent, or thereabouts, efficient.

The gas immediately permeates the ore mass in this region, the second from the top. There is no combustion or smelting action. The ore has previous been highly heated, as has been also the reducing gas. The depth of this region and the temperatures of the ore and gas are such that by the time the gas has reached the top of this second region and passes up into the bottom of the upper region the gas has just reached its condition of "saturation". That is to say, it has absorbed oxygen from the iron to a relatively small extent, 30 per cent, or thereabouts, of the gas volume being oxidized, the remaining 70 per cent still being in its initial condition. Before the oxidization of the gas becomes sufficient to cause a reoxidizing of the iron the gas passes into the upper region where it commingles with the incoming ore mass. In the horizontal planes at the bottom of the upper region are tuyères delivering air, under blast if necessary. This commingles with the gas and the latter is ignited, generating a relatively high heat; but not sufficient to smelt any of the components of the ore.

When the burned gas reaches the top of the ore in the stack it is drawn off through exhaust ducts. If it be still further combustible it is taken to stoves or burning chambers where its further combustion is utilized for the heating of the reducing gas that is to be introduced at the bottom of the reducing chamber.

It will be seen that in this way a continuous stream of ore can be passing down the stack, it first becoming highly heated by the combustion of the gas in contact with it; then passing through the reducing region where there is no combustion beyond the oxidizing of the gas by the iron. Finally the reduced sponge moves downward to the cooling chamber. And from the latter, after being sufficiently cooled, the sponge is discharged.

A delicate regulation of the temperatures of the ore and of the reducing gas can be accomplished by any suitable devices. The length of the time during which the gas, while acting as an effective reducing agent, contacts with the ore, can be regulated in any suitable way.

To assist in attaining this delicate regulation I install pyrometers at the critical points, and also instruments which indicate the exact constitution of the gas from time to time. The close regulating of conditions, which I practice, and which governs the reducing of the iron, on the one hand, and prevents the reducing of the various accompanying metals and metalloids, on the other hand, enables me to secure the selective reduction of the iron, for when I observe that from any cause (as the initial constitution of the gas, the character of the ore, the temperature of the mass in the reducing region, or the like) the reducing gas drops in its efficiency before it has passed through the entire ore mass, and is in danger of reoxidizing the metal, I cause its escape by means of by-passes, or equivalents, and introduce rich gas at proper points in compensation; although the same purpose can be accomplished in either of several ways. And if the pyrometers, or equivalent indicators, show that the ore which is being pre-heated (preliminary to its entering the reducing region) is being too highly heated by the burning of the "saturated" gases (coming from the reducing region), I adjust the temperature by by-passing some of the gas and conducting it directly to the hot blast stoves or other apparatus above specified. When I find, upon the contrary, that there is not enough fuel value in the "saturated" gas to properly pre-heat the ore I introduce to the pre-heating region sufficient fresh, rich gas which I divert from the mains.

While I have mentioned one of the reducing gases commonly employed, it is to be understood that numerous others are contemplated, such as acetylene and forms of rich hydrocarbon gas produced from oil or pulverized coal.

I have also mentioned 700° C., or thereabouts, as the temperature which, on the average, I have in mind relative to the reducing of the iron. But because of variations in the constitution of the ore, and from other causes, this temperature may vary a number of degrees above and below the point specified. With such variations there should be a corresponding variation in the conditions which I observe in carrying on my treatment. At the lower temperatures a leaner gas can be employed; as the temperature rises a righer and richer gas must be used, for at the higher temperatures the oxidizing elements (such as $CO_2$ and $H_2O$) become ascendant and stop the reducing action. The power of the oxidizing elements in the gas increases more rapidly than does that of the reducing elements as the temperature rises.

I aim to keep it considerably below 1000° C. while reducing, and succeed in preventing the reducing of the bodies foreign to iron; this being one of the very disadvantageous results in blast furnace treatment.

I am aware that many methods have been proposed for direct reduction of iron from its ores while they are in their native condition. And I have, myself, been largely occupied in the sintering of ores of this class to prepare them for blast furnace treatment. But I have now found that the peculiar method of preparing, regulating and applying the reducing gases to the porous sintered ore of my manufacture gives results far superior to those obtained by any of the earlier methods of treatment known to me.

What I claim is:

1. The herein described method of treating ores containing oxides of iron, it consisting in commingling with the ore a carbonaceous materal and sintering it to transform it into a highly porous body, then causing a body of reducing gas of relatively high initial reducing efficiency to pass through and permeate the particles of said ore body while heated to the point necessary for reducing, causing the iron to oxidize a relatively small proportion of the said gas, and then causing the said body of gas to immediately move out of contact with the ore particles prior to the gas becoming efficient in reoxidizing the ore.

2. The herein described method of treating ores containing oxides of iron, it consisting in commingling with the ore a carbonaceous material and sintering it to transform it into a highly porous body, then causing a body of reducing gas of relatively high initial reducing efficiency to pass through and permeate the particles of said ore while heated to the point necessary for reducing, causing the iron to oxidize a relatively small proportion of the said gas, then causing the body of gas to immediately move out of contact with the ore prior to the gas becoming efficient in reoxidizing the iron, then causing the combustion of the escaping gas, and preliminarily heating other ore with the products of the combustion.

3. The herein described method of treating ores containing oxides of iron, it consisting in subjecting the said ore to a sintering treatment and forming thereof a body of ore particles which are all highly porous throughout, then preliminarily heating a mass of the said ore, passing through the said heated mass a body of preliminarily heated reducing gas which is initially of relatively high reducing efficiency, regulating the temperature of the air while contacting with the reducing gas and the time during which said contact occurs to prevent the gas from being oxidized by the iron beyond the saturation point, and immediately causing a body of gas to pass out of contact with the ore mass before said saturation point is passed.

4. The herein described method of treating ores containing oxides of iron, it consisting in commingling with the ore a combustible material and sintering it to transform it into a body of particles all of which are highly porous throughout, then causing reducing gas of relatively high initial reducing efficiency to pass through said ore and contact with the particles thereof, and causing the iron to oxidize a relatively small proportion of the said gas, then withdrawing the gas from the ore mass, then subjecting it to combustion, raising the temperature of a supplemental ore mass by the heat of said combustion, and then causing supplemental reducing gas of initially high reducing efficiency to contact with the said supplemental ore mass.

5. The herein described method of treating ores containing oxides of iron and also other metalliferous bodies, it consisting in commingling with the ore a combustible material and sintering it to transform it into a mass of particles all of which are highly porous throughout, then heating a body of said ore, causing a body of heated gas of relatively high initial reducing efficiency to pass through and contact with the porous particles of the said ore bodies while heated to the point necessary for reducing, regulating the temperature of the ore in relation to and while contacting with the reducing gas and in relation to the time during which said contact occurs, permitting the gas to be oxidized by the ore to a predetermined relatively low degree, and to prevent the gas from reducing the metalliferous materials other than iron, and immediately causing the gas to pass out of contact with the ore before said degree of oxidation of the gas is passed.

In testimony whereof, I affix my signature.

ARTHUR S. DWIGHT.